United States Patent
Zhou et al.

(10) Patent No.: US 8,820,183 B2
(45) Date of Patent: Sep. 2, 2014

(54) DECELERATION MECHANISM AND TRANSMISSION DEVICE UTILIZED THEREBY

(75) Inventors: Jiong Zhou, Shenzhen (CN); Zhi-Ming Zhao, Shenzhen (CN); Guo-Qing Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 978 days.

(21) Appl. No.: 12/758,980

(22) Filed: Apr. 13, 2010

(65) Prior Publication Data

US 2011/0124449 A1    May 26, 2011

(30) Foreign Application Priority Data

Nov. 23, 2009  (CN) .......................... 2009 1 0310250

(51) Int. Cl.
  *F16H 19/08*    (2006.01)
(52) U.S. Cl.
  USPC ........................................ 74/89.22; 474/64
(58) Field of Classification Search
  CPC .................................................... F16H 19/006
  USPC ................................. 474/64; 74/22 R, 89.22
  See application file for complete search history.

(56) References Cited

U.S. PATENT DOCUMENTS

| | | | | |
|---|---|---|---|---|
| 4,351,197 A | * | 9/1982 | Carson | 74/89.22 |
| 4,368,647 A | * | 1/1983 | Sakaguchi | 74/89.22 |
| 4,470,363 A | * | 9/1984 | Kalayjian | 114/144 R |
| 4,697,472 A | * | 10/1987 | Hiyane | 74/490.02 |
| 4,986,723 A | * | 1/1991 | Maeda | 414/729 |

FOREIGN PATENT DOCUMENTS

CN         200959029 Y     10/2007

* cited by examiner

*Primary Examiner* — William E Dondero
*Assistant Examiner* — Robert T Reese
(74) *Attorney, Agent, or Firm* — Novak Druce Connolly Bove + Quigg LLP

(57) ABSTRACT

A deceleration mechanism comprises a base, a transmission device rotatably connected to the base, and a driving device fixed to the base. The transmission device includes a driving assembly having a driving wheel and a driven assembly having a driven wheel. Diameter of the driven wheel is greater than that of the driving wheel. The driving device provides power to rotate the driving wheel. The transmission device further includes a transmission member wound on the driving wheel and the driven wheel. The transmission member winds on the driving wheel at least one winding, then criss-crosses and winds on the driven wheel.

11 Claims, 4 Drawing Sheets

DECELERATION MECHANISM AND TRANSMISSION DEVICE UTILIZED THEREBY

BACKGROUND

1. Technical Field

The present disclosure generally relates to robots and, particularly, to a deceleration mechanism and a transmission device utilized by the deceleration mechanism.

2. Description of Related Art

Deceleration mechanisms are widely used in industrial robotics and other applications. A deceleration mechanism often consists of a plurality of meshing gears with different diameters.

A commonly used deceleration mechanism includes an inner gear arranged in a shell, a crankshaft with an eccentrically rotating portion arranged in the shell, and a cycloidal gear sleeving on the eccentrically rotating portion. The cycloidal gear rotates about the eccentrically rotating portion, and the cycloidal gear not only meshes with the inner gear but also performs a revolution, and thereby generating an output speed lesser than the input rotating speed. However, to achieve higher degree of meshing and steady output, the cycloidal gear of the deceleration mechanism frequently forms a plurality of tightly fitted gear teeth on its outer surface. When too many of the gear teeth are formed on a deceleration mechanism of a reduced size, each gear tooth becomes very small, and with clearance between neighboring gear teeth becoming also very small, thereby leading to overlapping interference between roots of the neighboring gear teeth. Therefore, the cycloidal gear and the gear tooth are very difficult to be manufactured and have a higher cost and a more complicated structure.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
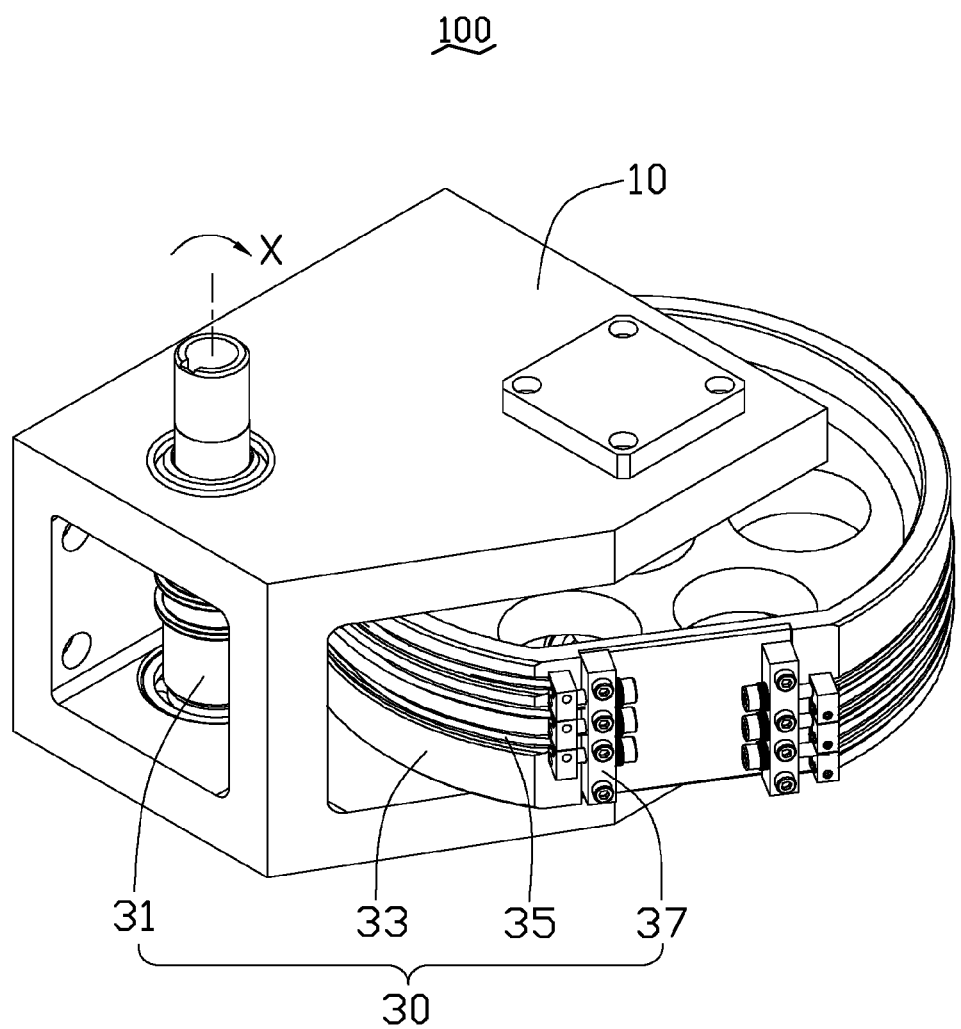
FIG. 1 is an assembled, isometric view of a deceleration mechanism as disclosed, including a base and a transmission device.

Referring to FIG. 1, a deceleration mechanism 100 used in a robot includes a base 10 and a transmission device 30 arranged on the base 10.

Figure 2:
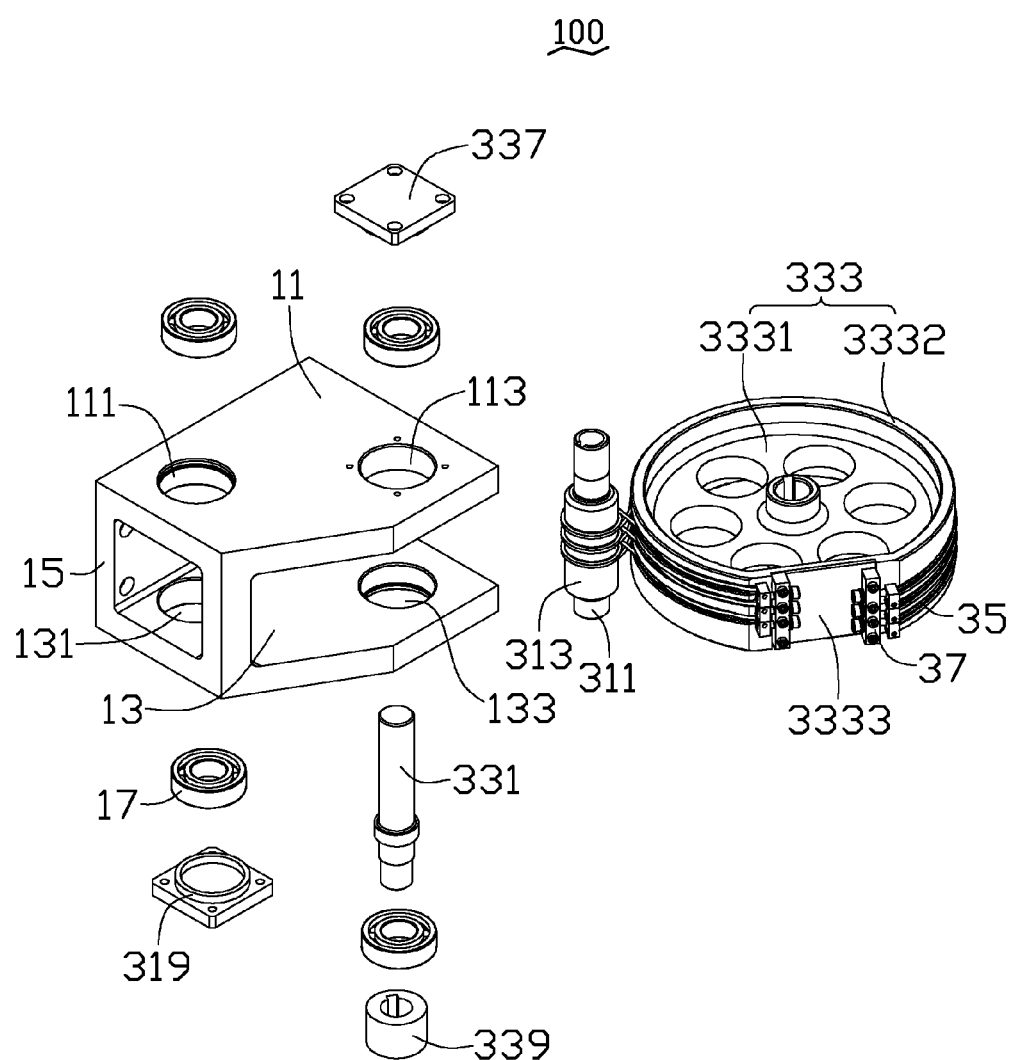
FIG. 2 is an exploded, isometric view of the deceleration mechanism of FIG. 1.

Referring to FIGS. 1 and 2, the base 10 includes a first fixing plate 11, a second fixing plate 13 parallel to the first fixing plate 11, and a connecting plate 15 connecting the first fixing plate 11 and the second fixing plate 13. The first fixing plate 11 defines a first position hole 111 and a second position hole 113. The second fixing plate 13 defines a third position hole 131 and a fourth position hole 133. Each of the position holes 111, 113, 131, 133 receives a bearing 17.

The transmission device 30 includes a driving assembly 31, a driven assembly 33, three transmission members 35, and two fixing assemblies 37.

The driving assembly 31 includes a driveshaft 311 and a driving wheel 313 arranged around the outside of the driveshaft 311. Opposite ends of the driveshaft 311 extend through the bearing 17 received in the first position hole 111 of the first fixing plate 11 and also through the bearing 17 received in the third position hole 131 of the second fixing plate 13, respectively.

Figure 3:
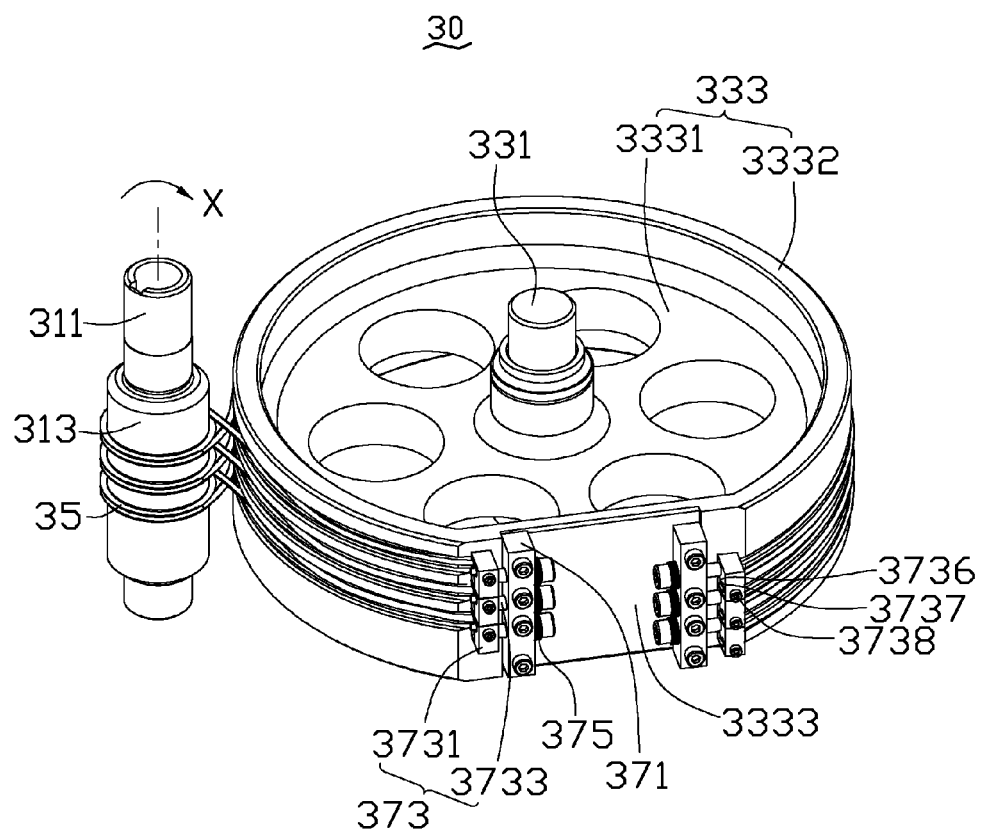
FIG. 3 is an assembled, isometric view of a transmission device as disclosed, utilized by a deceleration mechanism, such as, for example, that of FIG. 1, the transmission device including a driving assembly, a driven assembly, and a transmission member.
Figure 4:
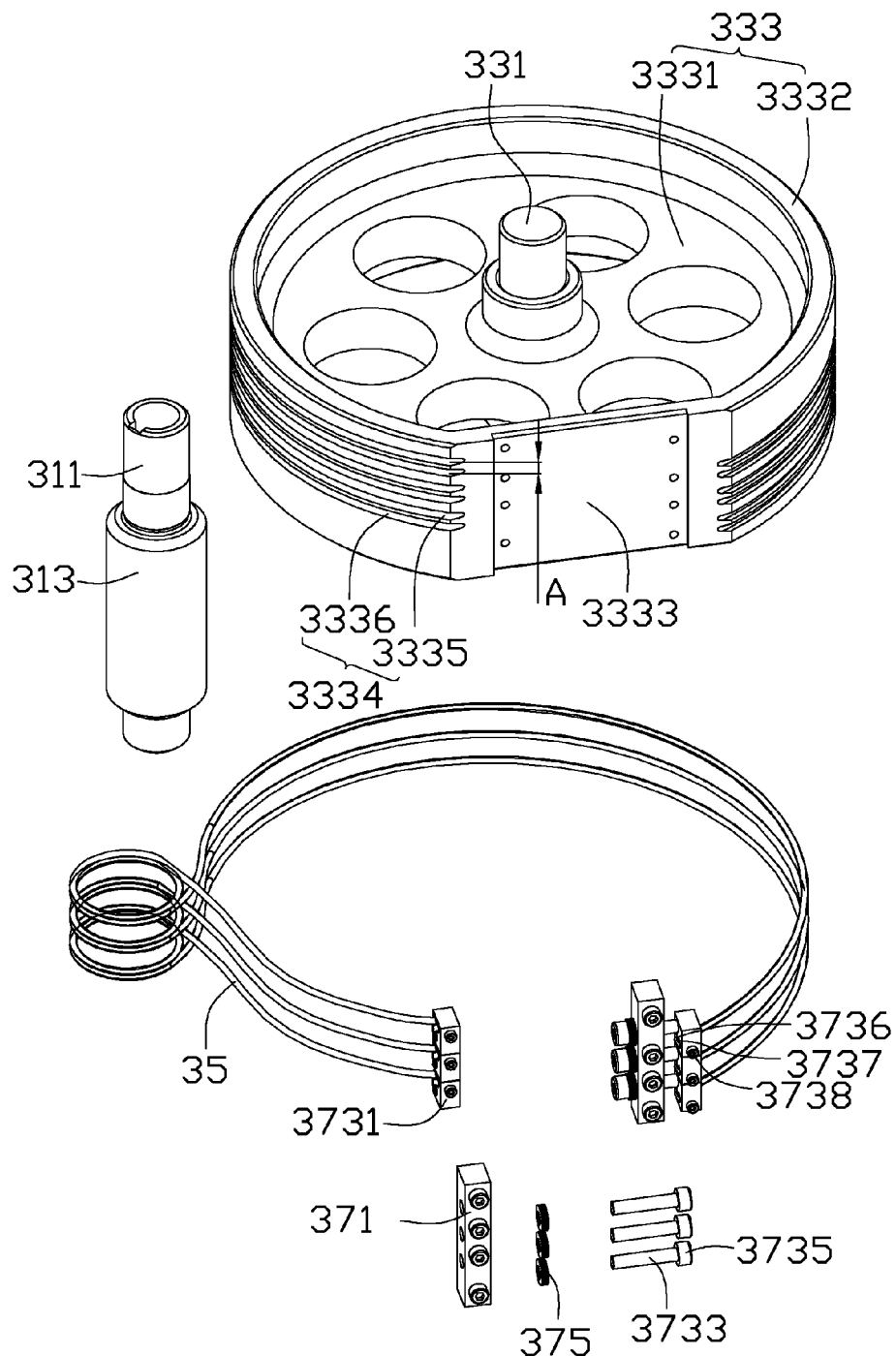
FIG. 4 is an exploded, isometric view of the transmission device of FIG. 3.

Referring to FIGS. 2 through 4, the driven assembly 33 includes a driven shaft 331 and a driven wheel 333 rotatably sleeved on the driven shaft 331. Opposite ends of the driven shaft 331 extend through the bearing 17 received in the second position hole 113 of the first fixing plate 11 and also through the bearing 17 received in the fourth position hole 133 of the second fixing plate 13, respectively. The driven wheel 333 includes a wheel body 3331 sleeved on the driven shaft 331 and a wheel casing 3332 sleeved outside of the wheel body 3331. The wheel body 3331 and the wheel casing 3332 can be of the same or different materials. In this illustrated embodiment, the wheel body 3331 and the wheel casing 3332 are made of different materials, with wheel body 3331 having lesser material density than the wheel casing 3332. The wheel body 3331 is aluminum alloy, and the wheel casing 3332 is made of steel, thus, the driven wheel 333 has both the requisite strength and lighter weight, thereby reducing the rotation inertia thereof. The wheel casing 3332 defines a latching slot 3333 along a radial direction and three channel portions 3334 along a circumferential direction. The channel portions 3334 are parallel, each encircling the wheel casing 3332, and opposite ends of each channel portion 3334 communicating with opposite sides of the latching slot 3333. Each channel portion 3334 includes a first groove 3335 and a second groove 3336 parallel to first groove 3335. A distance A between the first groove 3335 and the second groove 3336 is equal to the product of the diameter of the transmission member 35 and the number of windings of the transmission member 35 on the driving wheel 313, thereby avoiding interference of the transmission member 35 during operation of the deceleration mechanism 100. In the illustrated embodiment, a diameter of the driven wheel 333 is six times that of the driving wheel 313. A height difference between opposite ends of the first groove 3335 or of the second groove 3336 equals the product of the diameter of the transmission member 35 and the transmission ratio of the deceleration mechanism 100.

The transmission members 35 are parallel and wound on the driving wheel 313 and the driven wheel 333 with a "∝" shape. Parts of each transmission member 35 wind in one channel portion 3334 of the wheel casing 3332. Each transmission member 35 winds at least one full turn/loop around the driving wheel 313, then criss-crosses and is then wound around the driven wheel 333. A height difference of opposite ends of each transmission member 35 is created after being wound around the driving wheel 313, thus, opposite ends of each transmission member 35 are arranged in the first groove 3335 and the second groove 3336 of the channel portion 3334 of the driven wheel 333, respectively. The number of windings of the transmission member 35 on the driving wheel 313 can be adjusted according to the friction between the transmission 35 and the driving wheel 313 and the transmission power required. In the illustrated embodiment, each transmission member 35 winds twice around the driving wheel 313.

The transmission member 35 may be wire cable, steel bar, or other material of sufficient strength. In the illustrated embodiment, the transmission member 35 is a wire cable, capable of providing higher transmission precision, improved rigidity and steady transmission. There may further be any number of transmission members 35, additionally influencing strength thereof.

Each fixing assembly 37 includes a positioning member 371, a fastener 373 and a resilient member 375. In the illustrated embodiment, there are two fixing assemblies 37 located at opposite ends of the latching slot 3333 of the driven wheel 333, respectively. The positioning members 371 are fixed to the driven wheel 333 and resist opposite ends of the latching slot 3333 of the driven wheel 333 respectively. The fastener 373 includes a fixing block 3731 and a fastener bolt 3733 which extends through the positioning member 371 and is fastened with the fixing block 3731. The fixing block 3731 defines a first fixing hole 3736 and a second fixing hole 3737. One end of the transmission member 35 extends through the first fixing hole 3736 of the fixing block 3731, and then bends and extends through the second fixing hole 3737 of the fixing block 3731, and is fixed on the fixing block 3731 by a second fastener 3738. The other end of the transmission member 35 is fixed on another fixing block 3731 as described. The fastener bolt 3733 has a head 3735. The resilient member 375 includes a plurality of saucer-shaped spacers arranged in stacking formation and sleeves on the fastener bolt 3733. Opposite ends of the resilient member 375 resist the head 3735 of the fastener bolt 3733 and the positioning member 371, respectively.

During assembly of the deceleration mechanism 100, the driving assembly 31 of the transmission device 30 rotatably connects with the base 10 by one bearing 17. One end of the driveshaft 311 connects with the second fixing plate 13 of the base 10 by a flange 319, the other end connects with a driving device (not shown). The driven assembly 33 rotatably connects with the base 10 by one bearing 17. One end of the driven shaft 331 connects with the first fixing plate 11 of the base 10 by a flange 337, the other end connects with other device (not shown) by a flange 339. One end of the transmission member 35 is fixed on one fixing block 3731 of the fixing assembly 37 and winds in part of the first groove 3335 of the driven wheel 333. The transmission member 35 extends out of the first groove 3335, and then winds a plurality of windings around the driving wheel 313 and extends into the second groove 3336 of the channel portion 3334. The other end of the transmission member 35 is fixed on the other fixing block 3731. The transmission member 35 criss-crosses between the driving wheel 313 and the driven wheel 333, thus, substantially forming a "cc" shape. Opposite ends of the transmission member 35 are fixed on the fixing block 3731 by the fastener bolts 3733, thus, the transmission member 35 can wind snugly or firmly on the driving wheel 313 and the driven wheel 333.

During operation of the deceleration mechanism 100, the driving device rotates the driving wheel 313, in the illustrated embodiment, for example, the driving wheel 313 rotates in an X direction, which is clockwise, and sets one transmission member 35 in motion. When the driving wheel 313 rotates in the X direction, parts of the transmission member 35 which is wound around the driving wheel 313 may wind into the first groove 3335 of the driven wheel 333, and other parts of the transmission member 35 which is adjacent to the driving wheel 313 may be pulled out from the second groove 3336 and wound on the driving wheel 313. The friction between the transmission member 35 and the driving wheel 313 and between the transmission member 35 and the driven wheel 333 rotate the driven wheel 333 in a reverse direction to the X direction. As the driving wheel 313 continues to rotate, parts of the transmission member 35 wound in the first groove 3335 become extended, while parts of the transmission member 35 wound in the second groove 3336 correspondingly become retracted. When the driving wheel 313 has rotated a default number of windings, the driving device would rotate the driving wheel 313 in a reverse direction to the X direction, and the driven wheel 333 then rotates in the X direction correspondingly. Rotation of the driving wheel 313 and the driven wheel 333 is the same as described. The driving wheel 313 and the driven wheel 333 have different diameters, and the driven wheel 333 rotates one winding after the driving wheel 313 rotates the default number of windings, thus, deceleration is achieved.

The deceleration mechanism 100 achieves deceleration by using the transmission members 35 winding around the driven wheel 333 and the driving wheel 313. There is no need for a gear wheel or other complicated structures, and the manufacturing cost is lower. Windings with a "∝" shape increase the contact length of the transmission member 35, the driving wheel 313, and the driven wheel 333, and increase the friction between the transmission member 35 and the driving wheel 313 and between the transmission member 35 and the driven wheel 333, respectively.

In addition, the first groove 3335 and the second groove 3336 of the channel portion 3334 of the driven wheel 333 which are substantially parallel can receive different parts of one transmission member 35. A distance A provided between the first groove 3335 and the second groove 3336 prevents the transmission member 35 from contacting itself at the intersection, thereby avoiding attendant friction and extending service life.

Elastic force created by the resilient member 375 helps to maintain the firmness or snugness of the transmission member 35. When the transmission member 35 loosens, the fastener bolts 3733 can be used to resist the resilient member 375 and restores firmness or tightness.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A deceleration mechanism, comprising:
    a base; and
    a transmission device rotatably connecting with the base, comprising:
        a driving assembly comprising a driving wheel; and
        a driven assembly comprising a driven wheel having a diameter larger than the driving wheel; and
        at least one fixing assembly comprising a positioning member fixed on the driven wheel, a fastener connecting with the positioning member, and a resilient member, the fastener comprising a fixing block and a fastener bolt which extending through the positioning member and fastened with the fixing block, the fastener bolt comprising a head, the resilient member being sleeved on the fastener bolt and arranged between the head of the fastener bolt and the positioning member,
    wherein the transmission device further comprises at least two transmission members winding on the driving wheel for at least one winding and criss-crossing and winding on the driven wheel, respectively, the driven wheel defines at least two channel portions, each channel portion corresponds to one of the at least two transmission members, each channel portion comprises a first groove and a second groove substantially parallel to the first groove, each transmission member extends out of the first groove of the corresponding one of the at least two channel portions, and then winds around the driving wheel and extends into the second groove of the corresponding one of the at least two channel portions, an end of each of the at least two transmission members is fastened to the fixing block.

2. The deceleration mechanism of claim 1, wherein the at least one fixing assembly fixes opposite ends of the at least two transmission members and is connected to the driven wheel.

3. The deceleration mechanism of claim 2, wherein the driven wheel defines a latching slot and two fixing assemblies are deployed; the positioning member of each fixing assembly is arranged at opposite ends of the latching slot, and opposite ends of each transmission member are fixed on the two fixing assemblies, respectively.

4. The deceleration mechanism of claim 1, wherein each transmission member is a wire cable.

5. The deceleration mechanism of claim 1, wherein the driven wheel comprises a wheel body and a wheel casing sleeved outside of the wheel body, and a density of the wheel body is less than a density of the wheel casing.

6. A transmission device, comprising:
a driving assembly comprising a driving wheel; and
a driven assembly comprising a driven wheel; and
at least one fixing assembly comprising a positioning member fixed on the driven wheel, a fastener connecting with the positioning member, and a resilient member, the fastener comprising a fixing block and a fastener bolt which extending through the positioning member and fastened with the fixing block, the fastener bolt comprising a head, the resilient member being sleeved on the fastener bolt and arranged between the head of the fastener bolt and the positioning member,
wherein the transmission device further comprises at least two transmission members winding on the driving wheel for at least one winding and criss-crossing and winding on the driven wheel, respectively, the driven wheel defines at least two channel portions, each channel portion corresponds to one of the at least two transmission members, each channel portion comprises a first groove and a second groove substantially parallel to the first groove, each transmission member extends out of the first groove of the corresponding one of the at least two channel portions, and then winds around the driving wheel and extends into the second groove of the corresponding one of the at least two channel portions, an end of each of the at least two transmission members is fastened to the fixing block.

7. The transmission device of claim 6, wherein the at least one fixing assembly fixes opposite ends of the each transmission member and is connected to the driven wheel.

8. The transmission device of claim 7, wherein the driven wheel defines a latching slot and two fixing assemblies are deployed; the positioning member of each fixing assembly is arranged at opposite ends of the latching slot and opposite ends of each transmission member are fixed on the two fixing assemblies, respectively.

9. The transmission device of claim 7, wherein each transmission member is a wire cable.

10. A deceleration mechanism, comprising:
a base; and
a transmission device rotatably connecting with the base, comprising:
a driving assembly comprising a driving wheel; and
a driven assembly comprising a driven wheel having a diameter larger than the driving wheel; and
at least one fixing assembly comprising a positioning member fixed on the driven wheel, a fastener connecting with the positioning member, and a resilient member, the fastener comprising a fixing block and a fastener bolt which extending through the positioning member and fastened with the fixing block, the fastener bolt comprising a head, the resilient member being sleeved on the fastener bolt and arranged between the head of the fastener bolt and the positioning member,
wherein the transmission device further comprises at least two transmission members winding on the driving wheel for at least one winding and criss-crossing and winding on the driven wheel, respectively, and a height difference of opposite ends of each transmission member is created after the transmission member is wound around the driving wheel, the driven wheel defines at least two channel portions, each channel portion corresponds to one of the at least two transmission members, each channel portion comprises a first groove and a second groove substantially parallel to the first groove, each transmission member extends out of the first groove of the corresponding one of the at least two channel portions, and then winds around the driving wheel and extends into the second groove of the corresponding one of the at least two channel portions, an end of each of the at least two transmission members is fastened to the fixing block.

11. The deceleration mechanism of claim 10, wherein a distance between the first groove and the second groove is equal to a product of a diameter of each transmission member and a number of windings of each transmission member on the driving wheel.

* * * * *